(12) United States Patent
Balogh et al.

(10) Patent No.: US 12,341,682 B2
(45) Date of Patent: Jun. 24, 2025

(54) METHODS, SYSTEMS, AND COMPUTER READABLE MEDIA FOR CONTROLLING A TRAFFIC GENERATOR USING AN OPEN APPLICATION PROGRAMMING INTERFACE

(71) Applicant: Keysight Technologies, Inc., Santa Rosa, CA (US)

(72) Inventors: Andrey John Balogh, Bothell, WA (US); Himanshu Ashwini, Morrisville, NC (US); Alakendu Jana, West Bengal (IN); Vibaswan Roychowdhury, West Bengal (IN)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 85 days.

(21) Appl. No.: 18/142,012

(22) Filed: May 1, 2023

(65) Prior Publication Data

US 2024/0372797 A1 Nov. 7, 2024

(51) Int. Cl.
*H04L 43/55* (2022.01)
*H04L 43/50* (2022.01)

(52) U.S. Cl.
CPC .............. *H04L 43/55* (2022.05); *H04L 43/50* (2013.01)

(58) Field of Classification Search
CPC ................................ H04L 43/55; H04L 43/50
See application file for complete search history.

(56) References Cited

U.S. PATENT DOCUMENTS

| 6,170,081 B1 | 1/2001 | Fontana et al. |
| 6,990,654 B2 | 1/2006 | Carroll, Jr. |
| 7,401,259 B2 | 7/2008 | Bhowmilk et al. |
| (Continued) | | |

FOREIGN PATENT DOCUMENTS

| JP | 8212061 | 8/1996 |
| JP | 2003273963 | 9/2003 |
| (Continued) | | |

OTHER PUBLICATIONS

Official Action for Great Britain Application No. GB0601020.1 (Jun. 9, 2010).

(Continued)

*Primary Examiner* — Brian J. Gillis
*Assistant Examiner* — Chhian (Amy) Ling

(57) ABSTRACT

One example method for controlling a traffic generator using an open application programming interface (API) occurs at a vendor-agnostic traffic generator controller. The method comprises: receiving, via an open API, a vendor-agnostic test command; distributing, using at least one distribution rule, the vendor-agnostic test command to at least one service module; generating, by the at least one service module and using a translation rule, one or more device-specific commands for performing an aspect of testing or test configuration, wherein the at least one service module generates telemetry data associated with the generation of the one or more device-specific commands and the telemetry data is provided periodically or aperiodically to a data collector using an open telemetry API; and sending the one or more device-specific commands to a test related device, wherein the test related device includes a traffic generator.

20 Claims, 5 Drawing Sheets

(56) References Cited

U.S. PATENT DOCUMENTS

| | | | |
|---|---|---|---|
| 8,850,267 | B2 | 9/2014 | Aggarwal et al. |
| 9,529,630 | B1 | 12/2016 | Fakhouri et al. |
| 10,444,744 | B1 | 10/2019 | Arguelles et al. |
| 2002/0007483 | A1 | 1/2002 | Lopez |
| 2002/0133588 | A1 | 9/2002 | Doyle et al. |
| 2006/0161890 | A1 | 7/2006 | Green |
| 2013/0188519 | A1* | 7/2013 | Lu ............... H04L 12/6418 370/254 |
| 2014/0040665 | A1* | 2/2014 | Aggarwal ......... G06F 11/3684 714/E11.208 |
| 2016/0191349 | A1* | 6/2016 | Buege ............. H04L 41/5067 709/224 |
| 2018/0046811 | A1* | 2/2018 | Andriani .............. H04L 43/062 |
| 2019/0108110 | A1* | 4/2019 | Rathineswaran ... G06F 11/2733 |
| 2019/0332412 | A1* | 10/2019 | Boggarapu ......... G06F 9/45558 |
| 2020/0394169 | A1* | 12/2020 | Bhaskar ............. G06F 16/2291 |
| 2023/0080739 | A1* | 3/2023 | Taskin ................. H04L 43/08 370/252 |

FOREIGN PATENT DOCUMENTS

| | | |
|---|---|---|
| JP | 2003296146 | 10/2003 |
| JP | 2004062840 | 2/2004 |
| JP | 2004094496 | 3/2004 |

OTHER PUBLICATIONS

Official Action for Great Britain Application No. GB0601020.1 (Mar. 23, 2010).
Final Official Action for U.S. Appl. No. 11/038,597 (Jan. 12, 2010).
Official Action for U.S. Appl. No. 11/038,597 (Apr. 3, 2009).
Foreign Search Report for Application GB0601020.1, pp. 4 (Jun. 14, 2006).
"j2u," Nasra, Retrieved from http://www.nasra.fr/j2u.html (Copyright 2005).
"SequenceDiagram(n) 1.0 SequenceDiagram Graphics" [online] Retrieved Dec. 15, 2004; 6 pages.
"Sequence Diagram Tool" [online] Retrieved Dec. 13, 2004; 1 page.
"Project: Callflow Sequence Diagram Generator: Summary" [online] 3 pages; Retrieved Dec. 13, 2004; Retrieved from: http://sourceforge.net/projects/callflow.
"Go Beyond Hieroglyphics," EventStudio 2.5, [online] 3 pages; Retrieved Dec. 13, 2004 Retrieved from: http://www.eventhelix.com/EventStudio/.
Ambler, S., "UML 2 Sequence Diagrams," Agile Modeling; [online] Retrieved Nov. 17, 2004; 10 pages.
Gorman, I.E.: Generic XML Stream Parser API: An easier way to use SAX and Xerces. In: Extreme Markup Languages (2004).
Callflow Sequence Diagram Generator—Readme, Revision 1.9 htt://callflow.cvs.sourceforge.net/callflow/README?revision=1..9 &view+markup>, pp. 106 (Sep. 7, 2003).
Harel et al., "Message Sequence Charts," pp. 1-29 (Apr. 8, 2003).
Elsberry et al., "Using XML and SVG to Generate Dynamic UML Diagrams," pp. 1-17 (Mar. 2003).
Miller, et al., "OpenAPI Specification V3.1.0", OpenAPI Initiative, Feb. 15, 2021.
Open Traffic Generator APIs and Data Models, pp. 1-14, n.d.
Open Traffic Generator, Github, n.d., https://web.archive.org/web/20230329134211/https://github.com/open-traffic-generator (retrieved Aug. 2023).
Open Traffic Generator APIs & Data Models, pp. 1-15, n.d., https://web.archive.org/web/20230320193742/https://otg.dev/model/ (retrieved Aug. 2023).
Open API Automation Studio, IP.com Pub. Id. IPCOM000271215D, Nov. 2022.
Fuentes, et al., "Integrating complex legacy systems under OpenFlow control", European Workshop on Software Defined Networks, 20 pages, 2014.
Mendiola, et al. "An architecture for dynamic QoS management at Layer 2 for DOCSIS access networks using OpenFlow", Computer Networks, vol. 94, pp. 112-128 (2016).

* cited by examiner

300

| RULE ID | MATCH CRITERIA | PRE-FORWARDING ACTION(S) | NEXT HOP (E.G., PROCESSING MODULE) |
|---|---|---|---|
| 1 | MESSAGE CONTENT 'A' | | PS |
| 2 | MESSAGE CONTENT 'B' | ADD TOPOLOGY DATA | PLS |
| 3 | MESSAGE CONTENT 'C' | | TS |
| 4 | MESSAGE CONTENT 'D' | | SVS |
| 5 | MESSAGE CONTENT 'E' | GENERATE STATISTICS API REQUEST | GRPC SERVER |
| 6 | MESSAGE CONTENT 'F' | | REST SERVER |
| 7 | MESSAGE CONTENT 'G' | GENERATE LOG REPORT MESSAGE | DATA COLLECTOR |

| RULE ID | MATCH CRITERIA | TRANSLATION/ CONVERSION LOGIC | POST- TRANSLATION ACTION(S) |
|---|---|---|---|
| 1 | CONFIG CONTENT 'A' | LOGIC 'M' | ACTION(S) '1' |
| 2 | CONFIG CONTENT 'B' | LOGIC 'N' | ACTION(S) '2' |
| 3 | CONFIG CONTENT 'C' | LOGIC 'O' | ACTION(S) '3' |
| 4 | CONFIG CONTENT 'D' | LOGIC 'P' | ACTION(S) '4' |
| 5 | CONFIG CONTENT 'E' | LOGIC 'Q' | ACTION(S) '5' |
| 6 | CONFIG CONTENT 'F' | LOGIC 'R' | ACTION(S) '6' |
| 7 | CONFIG CONTENT 'G' | LOGIC 'S' | ACTION(S) '7' |
| 8 | CONFIG CONTENT 'H' | LOGIC 'T' | ACTION(S) '8' |

FIG. 4

METHODS, SYSTEMS, AND COMPUTER READABLE MEDIA FOR CONTROLLING A TRAFFIC GENERATOR USING AN OPEN APPLICATION PROGRAMMING INTERFACE

TECHNICAL FIELD

The subject matter described herein relates to testing network elements. More specifically, the subject matter relates to methods, systems, and computer readable media for controlling a traffic generator using an open application programming interface.

BACKGROUND

When testing networks with real-world workloads or performing stress testing on one or more entities thereof, a network test system may need to generate and send a large amount of test traffic. To achieve a high throughput, a network test system may use multiple traffic generators (e.g., independent packet generating devices or units) for generating test packets. In some test environments comprising a plurality of traffic generators, some traffic generators may lack support for a common application programming interfaces (API) and/or may have different capabilities. For example, in a test environment, some traffic generators from a first vendor or manufacturer may utilize a proprietary API that is different from other traffic generators from a second vendor or manufacturer. In this example, to configure the test environment, a test operator or a related test controller may need to generate and provide different test scripts or traffic flow templates that are supported by the various traffic generators. As such, in test environments where disparate traffic generators are available, it may be useful and more efficient to control these traffic generators using an open (e.g., non-proprietary) API.

SUMMARY

Methods, systems, and computer readable media for controlling a traffic generator using an open application programming interface (API) are disclosed. One example method occurs at a vendor-agnostic traffic generator controller. The method comprises: receiving, via an open API, a vendor-agnostic test command; distributing, using at least one distribution rule, the vendor-agnostic test command to at least one service module; generating, by the at least one service module and using a translation rule, one or more device-specific commands for performing an aspect of testing or test configuration, wherein the at least one service module generates telemetry data associated with the generation of the one or more device-specific commands and the telemetry data is provided periodically or aperiodically to a data collector using an open telemetry API; and sending the one or more device-specific commands to a test related device, wherein the test related device includes a traffic generator.

According to one example system for controlling a traffic generator using an open API, the test system comprises a memory, at least one processor, and a vendor-agnostic traffic generator controller implemented using the memory and the at least one processor. The vendor-agnostic traffic generator controller is configured for: receiving, via an open API, a vendor-agnostic test command; distributing, using at least one distribution rule, the vendor-agnostic test command to at least one service module; generating, by the at least one service module and using a translation rule, one or more device-specific commands for performing an aspect of testing or test configuration, wherein the at least one service module generates telemetry data associated with the generation of the one or more device-specific commands and the telemetry data is provided periodically or aperiodically to a data collector using an open telemetry API; and sending the one or more device-specific commands to a test related device, wherein the test related device includes a traffic generator.

The subject matter described herein may be implemented in software in combination with hardware and/or firmware. For example, the subject matter described herein may be implemented in software executed by a processor (e.g., a hardware-based processor). In one example implementation, the subject matter described herein may be implemented using a non-transitory computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors and memory.

As used herein, the term "telemetry data" refers to information collected or generated in situ. Example telemetry data may include log data, status information, metadata, operational parameters, error information, or performance metrics.

As used herein, the terms "function" or "module" refer to software in combination with hardware and/or firmware for implementing features described herein. In some embodiments, a module may include a field-programmable gateway array (FPGA), an application-specific integrated circuit (ASIC), or a processor.

BRIEF DESCRIPTION OF THE DRAWINGS

The subject matter described herein will now be explained with reference to the accompanying drawings of which:

FIG. 3 is a diagram illustrating example forwarding rule data usable for directing or causing data to be sent to service modules;

FIG. 4 is a diagram illustrating example translation rule data usable for generating hardware-specific test related commands.

DETAILED DESCRIPTION

Figure 1:
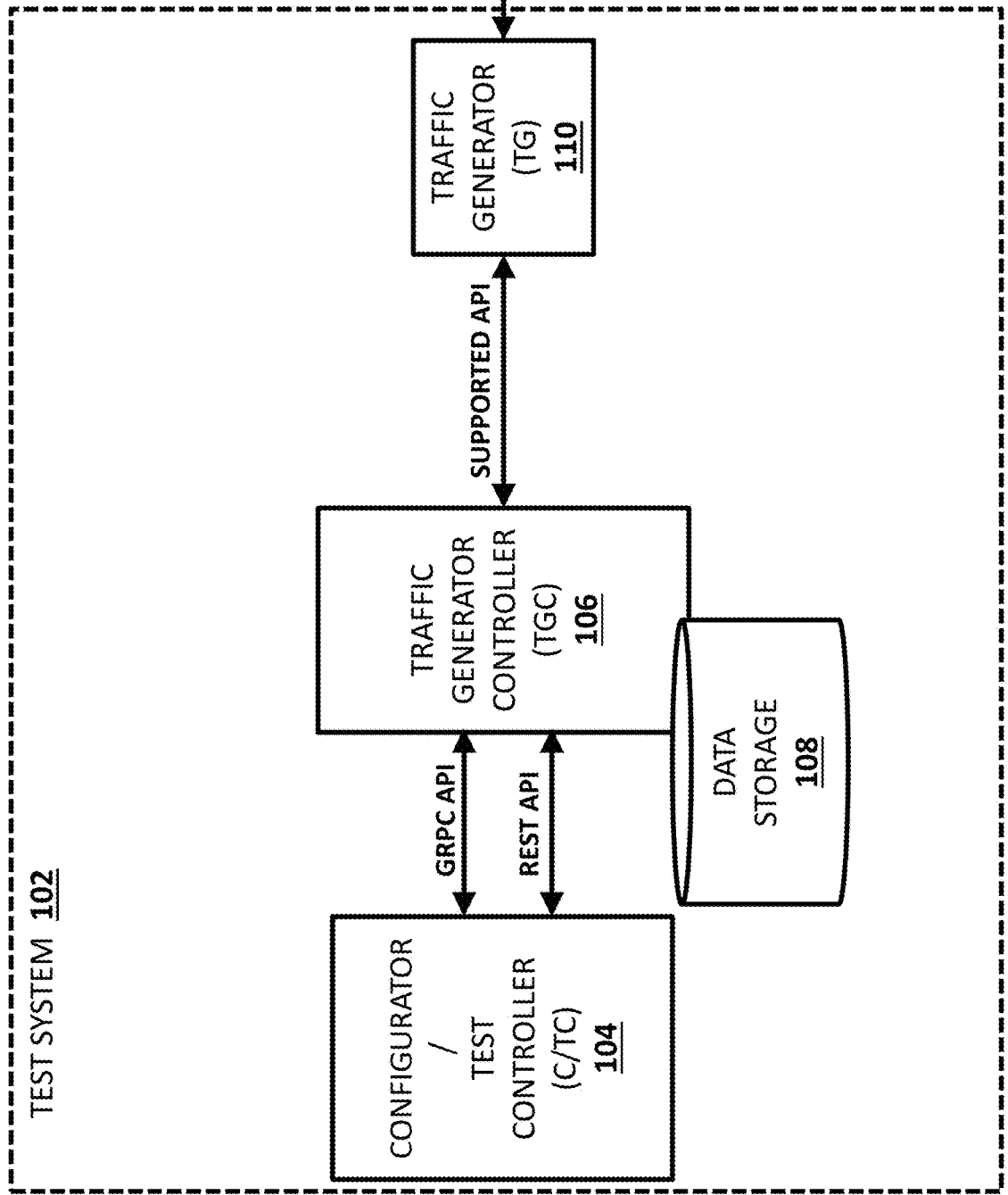
FIG. 1 is a diagram illustrating an example test environment for controlling a traffic generator using an open application programming interface (API)

The subject matter described herein relates to methods, systems, and computer readable media for controlling a traffic generator (TG) using an open application programming interface (API). An open API, such as one based on the OpenAPI Specification (OAS), may define a standard, language-agnostic (e.g., vendor-agnostic, hardware-agnostic, etc.) interface. In some examples, an open API may be used in conjunction with a REST or gRPC API and may allow both humans and computers to discover and understand the capabilities of a service or device without needing significant domain knowledge regarding underlying hardware or a proprietary communications protocol, e.g., a user may utilize an open API to configure the service or device without requiring access to source code, documentation, or performing network traffic inspection. In such examples, when an open API is properly defined, a user may understand and interact with the service or device with a minimal amount of implementation logic.

One technology area where an open APIs may be especially useful is testing networks and/or network equipment. Since test operators may need to interact with and configure multiple test related devices that lack support for a common API and/or have different capabilities when setting up test environments, it may be more time efficient to have a controller that can utilize an open API (e.g., a vendor-agnostic API) to configure different TGs or other test related devices, especially where each TG may use a different proprietary API or a different traffic configuration model.

In accordance with some aspects of the subject matter described herein, techniques, methods, equipment, systems, and/or mechanisms are disclosed for controlling a traffic generator using an open API. For example, a TG controller (TGC) in accordance with aspects described herein may be configured for utilizing an open API (e.g., an open TG (OTG) API) to configure one or more TGs. In this example, the open API may be designed to be vendor agnostic, easy to use, customer centric, and/or utilize a plug-in or modular approach for changes or additions. Continuing with this example, the TGC or modules therein (e.g., specialized software or hardware) may derive, convert, or translate open API based configuration information (e.g., commands) for generating TG-specific or TG-supported commands or instructions (e.g., configuration information in a format or protocol supported by an intended TG) for configuring a TG (e.g., hardware-based TGs) to emulate a network, clients, or traffic therefrom.

In accordance with some aspects of the subject matter described herein, a TGC or a related entity in accordance with aspects described herein may be software-based (e.g., a container or a virtual machine (VM)) deployable on various platforms or devices. In some embodiments, the TGC may be modular and may utilize components (e.g., modules or software for performing particular functions) as needed, thereby requiring less resources (e.g., less than 2 gigabytes (GB) of memory) and potentially reducing initialization times and/or execution times compared to various conventional test controllers.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a diagram illustrating an example test environment 100 for controlling a TG 110 using an open API. Referring to FIG. 1, test environment 100 may include test system 102 and one or more device(s) and/or system(s) under test (SUT) 112. Test system 102 may represent any suitable entity or entities (e.g., one or more computing platforms, nodes, or devices) associated with testing SUT 112 (e.g., one or more networks or devices). For example, test system 102 may generate and send traffic to SUT 112, receive traffic from SUT 112, and analyze one or more performance aspects associated with SUT 112.

In some embodiments, test system 102 may be a stand-alone tool, a testing device, or software executing on one or more processor(s). In some embodiments, test system 102 may be a single device or node or may be distributed across multiple devices or nodes. In some embodiments, test system 102 may include one or more modules for performing various test related functions. For example, test system 102 may include an emulation module for emulating one or more nodes or devices that communicates with SUT 112.

In some embodiments, test system 102 may include a configurator and/or a test controller (C/TC) 104, a network switch (NS) 116, TG 110, and a data storage 108. C/TC 104 may be any suitable entity or entities (e.g., software executing on a processor, an application-specific integrated circuit (ASIC), a field-programmable gateway array (FPGA), or a combination of software, an ASIC, or an FPGA) for performing one or more aspects associated with instructing or controlling a TGC 106 and/or for facilitating configuration of various aspects of test system 102. In some embodiments, C/TC 104 may be implemented using processor(s) (e.g., a physical processor, a general purpose microprocessor, a single-core processor, a multi-core processor, an FPGA, and/or an ASIC for executing software and/or logic) and/or memory for storing data, logic, software, or other information.

In some embodiments, C/TC 104 may include one or more communications interfaces, e.g., one or more network interface cards (NICs), for interacting with users, modules, and/or nodes. For example, C/TC 104 may use one or more communications interfaces for receiving various messages and one or more communications interfaces for sending various messages. In this example, some of the communications interfaces support automation e.g., via one or more programming languages (e.g., python, PHP, etc.), a representation state transfer (REST) API, a command line, and/or a web based GUI.

In some embodiments, C/TC 104 may include or provide a communications interface for allowing a user or another entity (e.g., an automated system or a device or system controlled or controllable by a human user) for selecting and/or configuring various aspects associated with testing SUT 112 and/or generating testing related metrics. For example, various user interfaces (e.g., an application user interface (API) and a graphical user interface (GUI)) may be provided for receiving user input or test configuration information, such as tests to be performed, types of metrics or statistics to be generated, a number of test messages per port or stream to be generated, and/or other settings.

In some embodiments, C/TC 104 may include one or more communications interfaces for interacting with test related entities, e.g., TGC 106 or other entities involved in testing SUT 112. For example, C/TC 104 may utilize an open API (e.g., an OTG API) for sending configuration information to TGC 106 and is usable by TGC 106 for configuring TG 110. In this example, open API based configuration information for TG 110 may be encapsulated or otherwise transmitted in one or more REST or gRPC message(s). Example configuration information may indicate what type or amount of test traffic is to be generated, what content to include (e.g., parameter values, sequence numbers, predetermined responses, etc.), speed or bandwidth usage associated with different test flows, etc.

In some embodiments, C/TC 104 or another entity (e.g., a test operator) may provide (e.g., to TGC 106) appropriate packet forwarding rules (e.g., rules for distributing open API based configuration information to appropriate modules of TGC 106) and/or translation rules (e.g., rules or logic for converting or translating open API data into support commands or information for configuring or controlling aspects of TG 110).

TGC 106 may be any suitable entity or entities (e.g., software executing on a processor, an ASIC, an FPGA, or a combination of software, an ASIC, or an FPGA) for performing one or more aspects associated with utilizing an open API to configure or control TG 110. For example, TGC 106 may be configured for utilizing an open API (e.g., a vendor-agnostic or hardware-agnostic OTG API) to configure TG 110. In this example, the TGC or modules therein (e.g., specialized software or hardware for different configuration aspects) may derive, convert, or translate open API based configuration information (e.g., open API commands) for generating TG-specific or TG-supported commands or instructions for configuring a TG. In some embodiments, TG-specific or TG-supported commands may cause TG 110 to generate specific test traffic with a mix of different protocols. In some embodiments, TG-specific or TG-supported commands may set traffic and protocol configurations (e.g., speed modes) at TG 110 and may configure TG 110 to create and/or provide metrics related to the configuration.

In some embodiments, TGC 106 may include a container or software running on a physical or virtual machine. For example, TGC 106 may include one or more Docker containers executing on a Linux based virtual machine (VM). In another example, TGC 106 may be a physical device or platform executing software or a VM that performs various controller related functions, e.g., functions or logic for generating, translating, or sending device-specific commands to TG 110.

In some embodiments, TGC 106 may include modules (e.g., software executing on one or more processors or other hardware) for performing various functions or services. For example, TGC 106 may include an API module for receiving configuration information (e.g., via an open API and/or other APIs), processing modules or service modules for generating device-specific commands for performing a particular type or aspect of TG configuration using at least some configuration information, and a distribution module for providing some configuration information to one or more relevant service modules. In some embodiments, TGC 106 may include a module or related logic for generating device-specific commands (e.g., using translation rules and configuration information received using an open API) and sending the hard-specific commands to TG 110 (e.g., via a proprietary or supported API).

In some embodiments, TGC 106 and/or other entities of test system 102 may include functionality for accessing data storage 108. Data storage 108 may be any suitable entity or entities (e.g., a storage device, a memory, a non-transitory computer readable medium, or a storage system) for maintaining or storing information related to testing. For example, data storage 108 may store forwarding rule data, translation rule data, service modules for generating TG-support commands or configuration information, test packet and flow template data, network topology information (e.g., port and/or connection information for various test related entities), test results or performance information, and/or other information. In some embodiments, data storage 108 may be located at one node or platform or distributed across multiple platforms or devices.

TG 110 may be any suitable entity or entities (e.g., software executing on a processor, an ASIC, an FPGA, or a combination of software, an ASIC, or an FPGA) for performing one or more aspects associated with generating or synthesizing test sessions, test cases, or related test packets. For example, TG 110 may receive configuration information (e.g., test traffic templates, port settings, layer 1 settings, network emulation settings, etc.) from TGC or modules or entities thereof. In this example, TG 110 may use received configuration information or related commands to generate test traffic associated with a test session or related scenario.

SUT 112 may be any suitable entity or entities (e.g., devices, systems, or platforms) for communicating with test system 102 or related entities and/or receiving, processing, forwarding, and/or sending test traffic, non-test traffic, or other data. For example, SUT 112 may include a network router, a network switch, a network device, a server, or a network controller. In another example, SUT 112 may include one or more systems and/or computing platforms, e.g., a data center or a group of servers and/or switches connected via a network. In yet another example, SUT 112 may include one or more networks or related components, e.g., a converged Ethernet network, an access network, a core network, or the Internet.

It will be appreciated that FIG. 1 is for illustrative purposes and that various nodes and/or modules, locations, and/or functionality described above in relation to FIG. 1 may be changed, altered, added, or removed. For example, C/TC 104 and TGC 106 or aspects thereof may be combined or integrated into a single platform, device, or entity.

Figure 2:
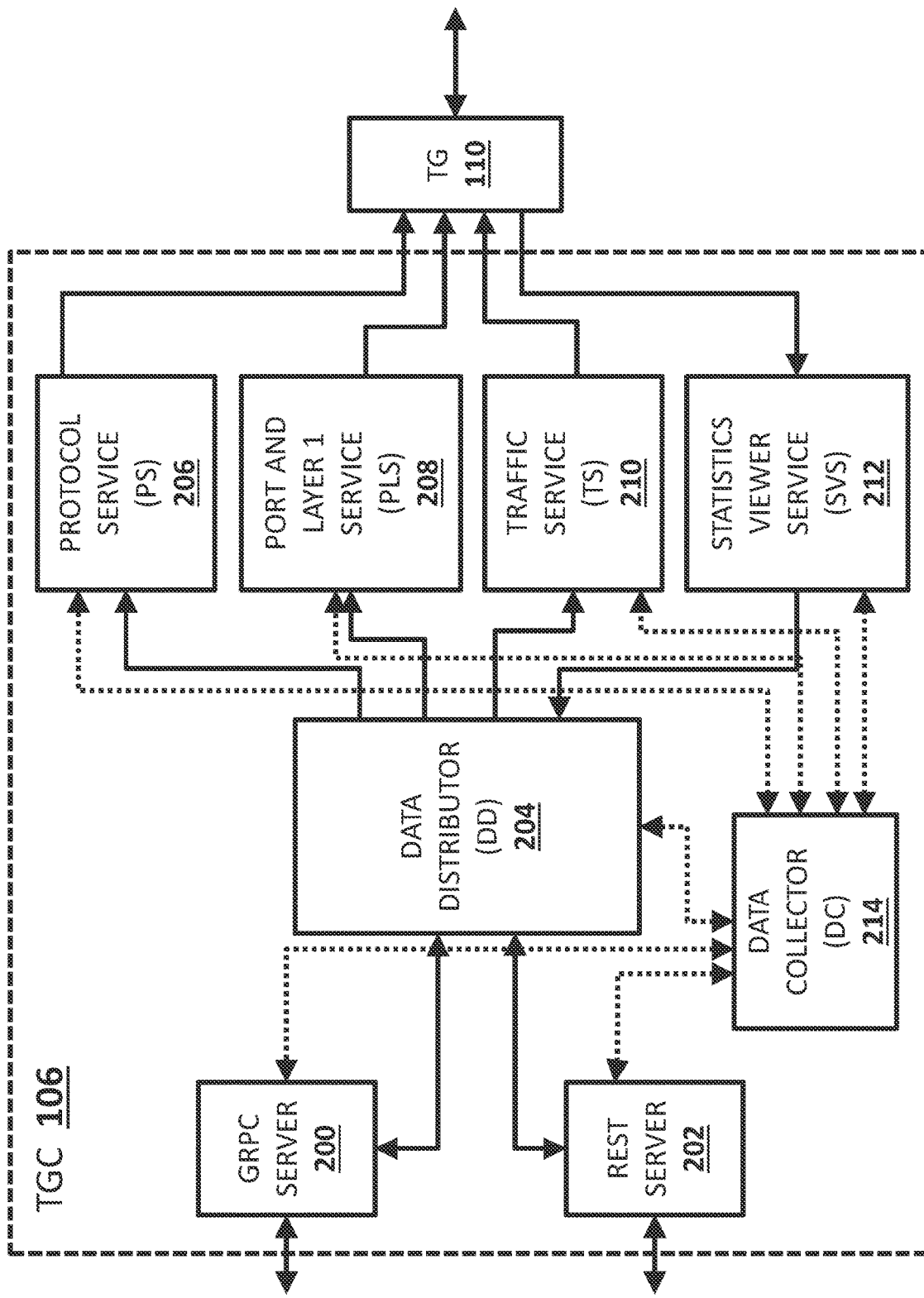
FIG. 2 is a diagram illustrating an example traffic generator controller.

FIG. 2 is a diagram illustrating an example TGC 106 for controlling TG 110 using an open API. Referring to FIG. 2, TGC 106 may include a gRPC server 200, a REST server 202, a data distributor (DD) 204, a protocol service (PS) 206, a port and layer 1 service (PLS) 208, a traffic service (TS) 210, a statistics viewer service (SVS) 212, and a data collector (DC) 214. For example, where TGC 106 is a VM or a container executing on a physical platform, each entity thereof may be a module (e.g., specific software or logic) that is deployable in or by the VM or container. In another example, where TGC 106 may be a physical device or a virtual device, each entity thereof may be separate from or integrated with TGC 106. In this example, TGC 106 or related entities (e.g., gRPC server 200, REST server 202, DD 204, PS 206, PLS 208, TS 210, SVS 212, DC 214, etc.) may be containers or VMs distributed across one or more physical platforms or devices.

gRPC server 200 may be any suitable entity or entities (e.g., software executing on a processor, an ASIC, an FPGA, or a combination of software, an ASIC, or an FPGA) for performing one or more aspects associated with receiving and sending messages using a gRPC API. In some embodiments, gRPC server 200 may be implemented using one or more processor(s) and/or memory. In some embodiments, gRPC server 200 may include an application or service that listens for communications (e.g., from C/TC 104) on a respective port associated with TGC 106 or a related node, e.g., port 5001. In some embodiments, gRPC server 200 may be configured to receive a gRPC request comprising TG configuration information (e.g., using an open API syntax or data format), parse the gRPC request to obtain, translate, or derive a configuration message or related data for further processing (e.g., by DD 204 or another entity), and send the message or related data to DD 204. In some embodiments, gRPC server 200 may be configured to receive response information from DD 204 or another entity (e.g., module or entity of TGC 106), may use the response information to generate one or more appropriate gRPC response(s), and send the gRPC response(s) to C/TC 104 (e.g., an end user or test operator).

REST server 202 may be any suitable entity or entities (e.g., software executing on a processor, an ASIC, an FPGA, or a combination of software, an ASIC, or an FPGA) for performing one or more aspects associated with receiving and sending messages using a REST or RESTful API. In some embodiments, REST server 202 may be implemented using one or more processor(s) and/or memory. In some embodiments, REST server 202 may include an application or service that listens for communications (e.g., from C/TC 104) on a respective port associated with TGC 106 or a related node, e.g., port 5000. In some embodiments, REST server 202 may be configured to receive a REST request comprising TG configuration information (e.g., using an open API syntax or data format), parse the REST request to obtain, translate, or derive a configuration message or related data for further processing (e.g., by DD 204 or another entity), and send the message or related data to DD 204. In some embodiments, REST server 202 may be configured to receive response information from DD 204 or another entity (e.g., module or entity of TGC 106), may use the response information to generate one or more appropriate REST response(s), and send the REST response(s) to C/TC 104 (e.g., an end user or test operator).

DD 204 may be any suitable entity or entities (e.g., software executing on a processor, an ASIC, an FPGA, or a combination of software, an ASIC, or an FPGA) for performing one or more aspects associated with distributing or controlling message or other data between various modules or entities of TGC 106. In some embodiments, DD 204 may be implemented using one or more processor(s) and/or memory. In some embodiments, DD 204 may include an application or service that listens for communications on various ports or from various entities and determines how the communications or a portion thereof should be processed and/or one or more services (e.g., processing modules) for performing such processing. For example, DD 204 may receive TG configuration information in an open API data format and may analyze the TG configuration information to determine one or more appropriate service(s) (to facilitate a user-intended or expected result. In this example, DD 204 may perform various actions (e.g., generating or modifying a message or related data) for facilitating further processing, e.g., by a next service like PS 206, PLS 208, TS 210, etc. In another example, (e.g., where TG configuration information requires processing by a chain of services), DD 204 may facilitate intercommunications between services, e.g., by performing pre- and/or post-distribution actions as communications are sent to a next service in the service chain. In some embodiments, DD 204 may be provisioned by a test operator or entity using preconfigured logic or rules, e.g., distribution rules for determining which data is to be handled by which services and/or translation or conversion rules for translating, modifying, or converting data from one format to another format (e.g., for consumption by end-users, services, or other entities).

PS 206 may be any suitable entity or entities (e.g., software executing on a processor, an ASIC, an FPGA, or a combination of software, an ASIC, or an FPGA) for configuring protocols or related operations. In some embodiments, PS 206 may be implemented using one or more processor(s) and/or memory. For example, PS 206 may generate TG supported configuration scripts or commands that program or provision TG 110 to utilize a particular protocol or emulate related operations during a test session.

In some embodiments, PS 206 may also include functionality (e.g., a fetcher application or service) that can directly collect or obtain information (e.g., metrics, statistics, or metadata) from a port processor or other hardware at TG 110 and provide it to DD 204, DC 214, or another entity.

PLS 208 may be any suitable entity or entities (e.g., software executing on a processor, an ASIC, an FPGA, or a combination of software, an ASIC, or an FPGA) for configuring ports, layer 1 characteristics, or related operations. In some embodiments, PLS 208 may be implemented using one or more processor(s) and/or memory. For example, PLS 208 may generate TG supported configuration scripts or commands that program or provision TG 110 to utilize certain port or layer 1 settings, e.g., speed, media, and negotiation settings. In some embodiments, PLS 208 may also generate commands or instructions for setting packet capture settings indicating which ports associated with TG 110 on which to capture packets.

TS 210 may be any suitable entity or entities (e.g., software executing on a processor, an ASIC, an FPGA, or a combination of software, an ASIC, or an FPGA) for configuring traffic (e.g., test flows, data plane settings, etc.) or related operations. In some embodiments, TS 210 may be implemented using one or more processor(s) and/or memory. For example, TS 210 may generate TG supported configuration scripts or commands that program or provision TG 110 to configure test traffic flows (e.g., amount, content, and/or type of different streams of test packets) for testing SUT 112, start test traffic flows, pause test traffic flows, and/or stop test traffic flows. In some embodiments, TS 210 may also generate commands or instructions for configuring various data plane settings or performing various data plane related operations.

SVS 212 may be any suitable entity or entities (e.g., software executing on a processor, an ASIC, an FPGA, or a combination of software, an ASIC, or an FPGA) for obtaining statistics, metrics, metadata, or other data from TG 110 and providing the data in an appropriate form (e.g., in a visual or human-digestible format and/or in a supported protocol) to a user or other entities. In some embodiments, SVS 212 may be implemented using one or more processor(s) and/or memory. For example, SVS 212 may generate TG supported configuration scripts or commands for fetching traffic (e.g., packet copies) and port metrics from TG 110 or a central processing unit (CPU) thereof. In some embodiments, SVS 212 may include functionality for formatting or converting received data into an appropriate format prior to providing the data to a user, C/TC 104, or another entity, e.g., via DD 204 or other TGC related entities. In some embodiments, SVS 212 may generate commands or instructions for causing various entities to generate metrics or metadata and provide the metrics or metadata to SVS 212, DC 214, or another entities.

In some embodiments, TGC 106 or entities thereof (e.g., gRPC server 200, REST server 202, DD 204, PS 206, PLS 208, TS 210, SVS 212, etc.) may collect or obtain telemetry data, e.g., information obtained or generated using telemetry or a related technique. For example, TGC 106 or entities thereof may collect or generate information (e.g., performance metrics, log data, error information, etc.) in situ (e.g., in place, on site, at the service module, locally, etc.). In this example, TGC 106 or entities thereof may provide the collected or generated information to DC 214 or other another entity for further processing, e.g., analysis or correlation with other data.

DC 214 may be any suitable entity or entities (e.g., software executing on a processor, an ASIC, an FPGA, or a combination of software, an ASIC, or an FPGA) for configuring log collections, log aggregation and/or correlation settings, or related operations. In some embodiments, DC 214 may be implemented using one or more processor(s) and/or memory. In some embodiments, DC 214 may periodically or aperiodically obtain logs or other data from various sources (e.g., gRPC server 200, REST server 202, DD 204, PS 206, PLS 208, TS 210, SVS 212, data stores, etc.) and then aggregate, correlate, or otherwise process the data to generate reports or combined logs for debugging, test analysis, and/or other purposes. In some embodiments, DC 214 may also provide collected data or derived data to one or more entities for additional processing. For example, DC 214 may collect logs or performance data from TGC related entities (e.g., gRPC server 200, REST server 202, DD 204, PS 206, PLS 208, TS 210, SVS 212, etc.) using an open telemetry API or other mechanisms and may aggregate the logs or performance data to a combined log that includes tracing data, timing memory information, etc. In this example, DC 214 may facilitate or provide this data to other entities, e.g., graphical model software for generating visuals or interactive models.

In some embodiments, TGC 106 or entities thereof (e.g., gRPC server 200, REST server 202, DD 204, PS 206, PLS 208, TS 210, SVS 212, etc.) may generate and send appropriate messages or commands to TG 110 (e.g., a physical unit, such as an ASIC based TG) or entities thereof (e.g., network interface cards, CPUs, etc.) via physical ports or other connections. For example, each TGC service may generate supported commands for configuring a portion of TG 110 for generating test traffic for a test session and may receive responses or other data from TG 110 or entities thereof (e.g., command or configuration acknowledgements from a management CPU of TG 110).

It will be appreciated that FIG. 2 is for illustrative purposes and that various depicted entities, their locations, and/or their functions described above in relation to FIG. 2 may be changed, altered, added, or removed.

FIG. 3 illustrates example forwarding rule data 300 usable for directing or causing data to be sent to service modules. For example, data 300 may include identifiers, match criteria, instructions, commands, or executables usable by TGC 106, DD 204, or another entity (e.g., a switch processor or other processor therein) for receiving open API commands or data, performing pre-forwarding processing (if needed) and, sending the open API commands or data to a next hop (e.g., a processing module or service module).

In some embodiments, data 300 or portions or variations thereof may be accessed and/or stored by TGC 106, DD 204, and/or other entities using one or more data structures or storage devices (e.g., memory on or accessible to TGC 106, DD 204, or other entities of test system 102).

Referring to FIG. 3, forwarding rule data 300 may be depicted using a table representing various forwarding rules, e.g., rules for distribution open API command or data to an appropriate processing modules. For example, each table row depicted in FIG. 3 may represent a forwarding rule indicating a rule identifier for identifying the rule, match criteria for identifying data to be forwarded associated with the rule, pre-forwarding action(s) to perform on the data associated with the rule, and a next hop for receiving the data associated with the rule.

In some embodiments, a rule identifier may include any suitable information for identifying a forwarding rule. For example, a rule identifier may be a value (e.g., an alphanumeric value, an integer, or a letter) that uniquely identifies a forwarding rule. In another example, a rule identifier may also indicate a direction (e.g., ingress or egress) or a port or service (e.g., a service module) where the rule is deployed or utilized, e.g., DD 204, PS 206, PLS 208, TS 210, SVS 212, etc.

In some embodiments, match criteria may include any suitable information (e.g., a regular expression, a header field value, a payload portion value, or a string of text with one or more wildcard characters) for identifying an open API command or other data to be forwarded or distributed using an associated forwarding rule. For example, TGC 106 or an entity thereof (e.g., DD 204) may be configured to receive an open API command or other information (e.g., from C/TC 104) and then inspect the received open API command or other information (e.g., type-length-value (TLV) elements or parameter values) to determine whether match criteria for any stored forwarding rule matches the received information. In some embodiments, TGC 106 or an entity thereof (e.g., DD 204) may be configured to know which data portion(s) (e.g., TLV element(s) or parameter value(s)) to compare to match criteria, e.g., based on rule metadata, test settings, or a test operator. In some embodiments, pre-forwarding action(s) may include any suitable information (e.g., action identifiers, instructions, scripts, commands, etc.) for identifying one or more pre-forwarding actions to be performed on a an open API command or other information (e.g., from C/TC 104) associated with a forwarding rule. In some embodiments, pre-forwarding action(s) may depend on the type of translation rules, service module involved, test settings, and/or TG configuration and may be performed by TGC 106 or another entity (e.g., DD 204). For example, after a received open API command or data therein matches an ingress forwarding rule (e.g., rule '2' of data 300), a corresponding pre-forwarding action may include adding topology information associated with test environment 100 to the API command or a related message prior to sending the modified API command or related message to a next hop for processing. In another example, a corresponding pre-forwarding action may include generating a statistics API request for starting an fetcher service for requesting information from TG 110, SUT 112, or another entity periodically during a test session. In another example, a corresponding pre-forwarding action may include generating or sending a log message providing metadata or statistics regarding a match criteria event or other events associated with the corresponding rule or TGC 106.

In some embodiments, a next hop may include any suitable information (e.g., a port identifier, a service identifier, a module identifier, etc.) for identifying a next hop or module (e.g., DD 204, PS 206, PLS 208, TS 210, SVS 212, DC 214, gRPC server 200, REST server 202, etc.) for processing open API command or data. For example, a next hop portion of a forwarding rule may be static and may be based on a type of data that needs translation or conversion. In another example, a next hop port portion of a forwarding rule may indicate that the next hop port is determinable using one or more dynamic factors, e.g., time of day, type of TG available for a test session, etc.

It will be appreciated that data 300 in FIG. 3 is for illustrative purposes and that different and/or additional information may also be stored or maintained. Further, it will be appreciated that data 300 or related data may be stored in various data structures, memories, media, and/or in one or more locations.

FIG. 4 is a diagram illustrating example translation rule data 400 usable for generating hardware-specific test related commands. In some embodiments, data 400 may include any suitable information for generating hardware-specific test related commands (e.g., TG configuration commands). For example, data 400 may include translation or conversion rules or related logic for generating device-specific commands from open API commands or other information provided by C/TC 104. In some examples, data 400 may include rules for generating commands supported by different TGs 110 and/or for different TG configuration aspects or areas.

In some embodiments, data 400 or portions or variations thereof may be accessed and/or stored by test system 102, TGC 106, and/or other entities (e.g., PS 206, PLS 208, TS 210, SVS 212, etc.) using one or more data structures or storage devices. For example, each service module may include or access a local data store comprising data 400 or a portion thereof that is relevant for generating commands or instructions associated with the service.

Referring to FIG. 4, data 400 may be depicted using a table representing various translation or conversion rules. For example, each table row depicted in FIG. 4 may represent a translation or conversion rule indicating a rule identifier for identifying the rule, match criteria for identifying data to convert or translate using the rule, translation or conversion logic to convert or translate the data associated with the rule, and post-translation action(s) to perform associated with the rule.

In some embodiments, match criteria may include any suitable information (e.g., a regular expression, a header field value, a payload portion value, or a string of text with one or more wildcard characters) for identifying an open API command or other data that is to be translated, converted, or otherwise used in generating one or more hardware-specific test related commands (e.g., one or more TG configuration commands supported by TG 110). For example, TGC 106 or an entity thereof (e.g., PS 206) may be configured to receive an open API command or other information (e.g., from C/TC 104) via DD 204 and then inspect the received open API command or other information (e.g., type-length-value (TLV) elements or parameter values) to determine whether match criteria for any stored translation or conversion rule matches the received information. In some embodiments, TGC 106 or an entity thereof (e.g., PS 206) may be configured to know which data portion(s) (e.g., TLV element(s) or parameter value(s)) to compare to match criteria, e.g., based on rule metadata, test settings, or a test operator.

In some embodiments, translation or conversion logic may include any suitable information (e.g., action identifiers, instructions, scripts, commands, etc.) for generating device-specific commands (e.g., TG supported configuration instructions from open API commands or other information, e.g., provided by C/TC 104. In some embodiments, translation or conversion logic may depend on the type of translation rules, service module involved, test settings, and/or TG configuration. For example, assuming a translation rule is for converting an open API traffic service configuration command to a proprietary command for a particular model of TG 110, TS 210 may receive the open API traffic service configuration command, parse TLV elements that are needed to generated the proprietary command, and then generate, using the parsed data and a proprietary command template indicated by the logic, the proprietary command.

In some embodiments, post-translation action(s) may include any suitable information (e.g., action identifiers, instructions, scripts, commands, etc.) for sending generated commands or data onward (e.g., to TG 110, DD 204, PS 206, PLS 208, TS 210, SVS 212, etc.) In some embodiments, post-translation action(s) may depend on the type of translation rules, service module, test settings, and/or TG configuration. For example, after a received open API command or configuration information is converted using an appropriate translation rule, a corresponding post-translation action may include adding the commands to a TG supported script comprising a plurality of TG configuration commands. In another example, a post-translation action may include sending a generated hardware-specific or TG supported command to TG 110 for execution. In another example, a post-translation action may include setting a timer to cause a generated hardware-specific or TG supported command to be sent to TG 110 at a later time. In another example, a post-translation action may involve notifying a service module or DD 204 that translation or conversion is completed and/or sending the command or related information to another entity for further processing.

It will be appreciated that data 400 in FIG. 4 is for illustrative purposes and that different and/or additional information may also be stored or maintained. Further, it will be appreciated that data 400 or related data may be stored in various data structures, memories, media, and/or in one or more locations.

Figure 5:
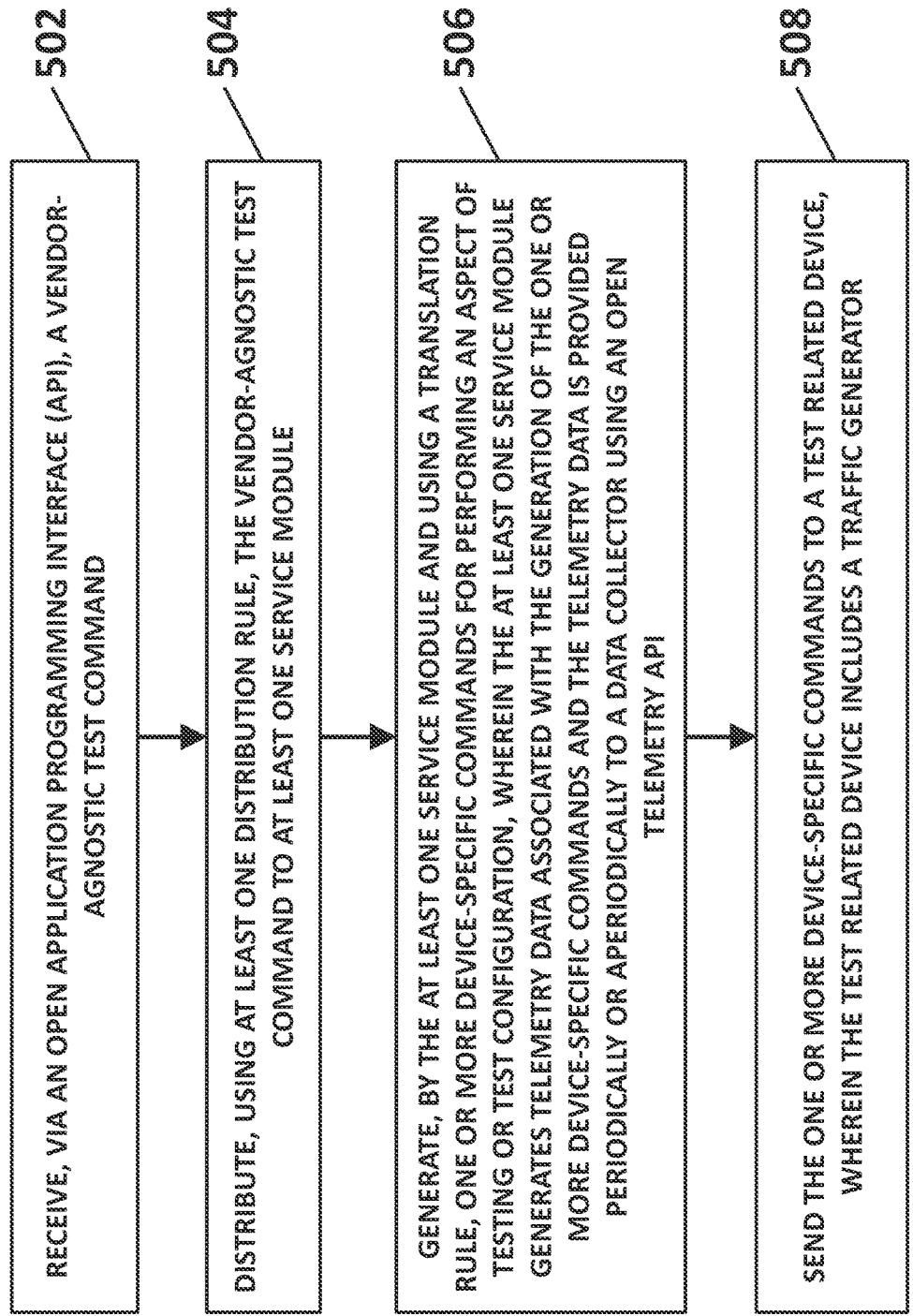
FIG. 5 is a block diagram illustrating an example process for controlling a traffic generator using an open API.

FIG. 5 is a block diagram illustrating an example process 500 for controlling TG 110 using an open API. In some embodiments, example process 500 may include steps 502, 504, 506, and/or 508. In some embodiments, process 500, or portions thereof, may be performed by test system 102, TGC 106, and/or another node or module. For example, process 500 may occur at a hardware-agnostic or vendor-agnostic TGC (e.g., TGC 106). In this example, a hardware-agnostic or vendor-agnostic TGC may include software or a container executing on a VM or physical machine. In another example, a hardware agnostic TGC may be a physical appliance or device.

Referring to FIG. 5, in step 502, a vendor-agnostic test command may be received via an open API. In some embodiments, a vendor-agnostic test command is received using a REST API, a gRPC API, or an OTG API. In some embodiments, an open API based command (e.g., an OTG configuration command) may be encapsulated in a gRPC message or a REST message.

In step 504, the vendor-agnostic test command may be distributed, using at least one distribution rule, to at least one service module. For example, REST server 202 may receive and decapsulate or parse a REST message to obtain or derive an open API command. In this example, DD 204 may obtain and inspect the open API command and determine (e.g., using a distribution or forwarding rule, such as data 300) an appropriate service (e.g., PS 206) for processing the open API command and generating a corresponding TG-supported command.

In step 506, one or more device-specific commands for performing an aspect of testing or test configuration may be generated, by the at least one service module and using a translation rule. In some embodiments, at least one service module may generate telemetry data (e.g., log data, status information, metadata, operational parameters, error information, and/or performance metrics) associated with the generation of the one or more device-specific commands and the telemetry data may be provided periodically or aperiodically to a data collector (e.g., DC 214) using one or more telemetry protocols or mechanisms, e.g., an open telemetry API and/or a proprietary telemetry API.

In step 508, the one or more device-specific commands may be sent to a test related device. In some embodiments, a test related device may include a TG, e.g., TG 110. In some embodiments, a test related device (e.g., TG 110) may generate traffic that emulates one or more clients and/or network devices associated with testing SUT 112.

In some embodiments, at least one service module may include a protocol service module (e.g., PS 206) and one or more device-specific commands generated by the protocol service module may include protocol service commands for facilitating protocol configuration and operation on a test related device, e.g., TG 110.

In some embodiments, at least one service module may include a port service module (e.g., PLS 208) and one or more device-specific commands generated by the port service module may include port service commands for facilitating port configuration and operation on the test related device, wherein facilitating the port configuration may include configuring speed, media, negotiation, or packet capture settings of test ports of a test related device, e.g., TG 110.

In some embodiments, at least one service module may include a traffic service module (e.g., TS 210) and one or more device-specific commands generated by the traffic service module may include traffic service commands for facilitating data plane or traffic configuration and operation on a test related device, e.g., TG 110.

In some embodiments, at least one service module may include a reporting service module (e.g., SVS 212) and one or more device-specific commands generated by the reporting service module may include reporting service commands for facilitating test metrics reporting configuration and operation on a test related device, e.g., TG 110.

In some embodiments, facilitating test metrics reporting configuration may include configuring a fetcher or a fetching service (e.g., via DC 214 or SVS 212) to obtain traffic and port metrics from a port processor or a CPU of a test related device, e.g., TG 110.

In some embodiments, a log collector service module (e.g., DC 214) may be configured for collecting logs from various services of TGC 106 using open telemetry and aggregating the logs, e.g., by providing correlated tracing data, timing memory information, etc.

In some embodiments, at least one service module may include a log generation module service (e.g., DC 214 or SVS 212) and one or more device-specific commands generated by the log generation service module may include log generation commands for facilitating log generation configuration and operation on a test related device, e.g., TG 110.

In some embodiments, a test related device, such as TG 110, may include a hardware-specific TG for sending test traffic to SUT 112 and the hardware-specific TG may support device-specific commands generated by a vendor-agnostic TGC (e.g., TGC 106) or various modules thereof.

It will be appreciated that process 500 is for illustrative purposes and that different and/or additional actions may be used. It will also be appreciated that various actions described herein may occur in a different order or sequence.

It should be noted that test system 102, TGC 106, and/or various modules, nodes, or functionality described herein may constitute a special purpose computing platform, device, or system. For example, test system 102 or TGC 106 may be a network test appliance configured to perform various aspects described herein. Further, test system 102, TGC 106, and/or various modules or functionality described herein can improve the technological field of network testing by providing various techniques, systems, methods, or mechanisms for controlling a TG using an open API, e.g., by using TGC 106 comprising various modules for performing various aspects of TG configurations, where the various modules may utilize translational rules or related logic for generating hardware-specific test commands, e.g., via a TG supported API or data format.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for controlling a traffic generator using an open application programming interface, the method comprising:
    at a vendor-agnostic traffic generator controller:
        receiving, via an open application programming interface (API), a vendor-agnostic test command;
        distributing, using at least one distribution rule, the vendor-agnostic test command to at least one service module;
        generating, by the at least one service module and using a translation rule, one or more device-specific commands for performing an aspect of testing or test configuration, wherein the at least one service module generates telemetry data associated with the generation of the one or more device-specific commands and the telemetry data is provided periodically or aperiodically to a data collector using an open telemetry API, wherein the telemetry data includes metadata associated with the generation of the one or more device-specific commands; and
        sending the one or more device-specific commands to a test related device, wherein the test related device includes a traffic generator, wherein generating the one or more device-specific commands includes parsing type length value (TLV) elements in the vendor-agnostic test command and generating, using the parsed TLV elements, a proprietary command for a particular model of traffic generator.

2. The method of claim 1 wherein the at least one service module includes a protocol service module and the one or more device-specific commands includes protocol service commands for facilitating protocol configuration and operation on the test related device.

3. The method of claim 1 wherein the at least one service module includes a port service module and the one or more device-specific commands includes port service commands for facilitating port configuration and operation on the test related device, wherein facilitating the port configuration includes configuring speed, media, negotiation, or packet capture settings of test ports of the test related device.

4. The method of claim 1 wherein the at least one service module includes a traffic service module and the one or more device-specific commands includes traffic service commands for facilitating data plane or traffic configuration and operation on the test related device.

5. The method of claim 1 wherein the at least one service module includes a reporting service module and the one or more device-specific commands includes reporting service commands for facilitating test metrics reporting configuration and operation on the test related device.

6. The method of claim 5 wherein facilitating test metrics reporting configuration includes configuring a fetcher or a fetching service for obtaining traffic and port metrics from a port processor or central processing unit (CPU) of the test related device.

7. The method of claim 1 wherein the at least one service module includes a log generation module and the one or more device-specific commands includes log generation commands for facilitating log generation configuration and operation on the test related device.

8. The method of claim 1 wherein the traffic generator includes a hardware-specific traffic generator for sending test traffic to a system under test (SUT) and the hardware-specific traffic generator supports the one or more device-specific commands.

9. The method of claim 1 wherein the vendor-agnostic test command is received using a REST API, a gRPC API, or an open traffic generator (OTG) API.

10. A system for controlling a traffic generator using an open application programming interface, the system comprising:
 a memory;
 at least one processor; and
 a vendor-agnostic traffic generator controller implemented using the memory and the at least one processor, wherein the vendor-agnostic traffic generator controller is configured for:
  receiving, via an open application programming interface (API), a vendor-agnostic test command;
  distributing, using at least one distribution rule, the vendor-agnostic test command to at least one service module;
  generating, by the at least one service module and using a translation rule, one or more device-specific commands for performing an aspect of testing or test configuration, wherein the at least one service module generates telemetry data associated with the generation of the one or more device-specific commands and the telemetry data is provided periodically or aperiodically to a data collector using an open telemetry API, wherein the telemetry data includes metadata associated with the generation of the one or more device-specific commands; and
  sending the one or more device-specific commands to a test related device, wherein the test related device includes a traffic generator, wherein generating the one or more device-specific commands includes parsing type length value (TLV) elements in the vendor-agnostic test command and generating, using the parsed TLV elements, a proprietary command for a particular model of traffic generator.

11. The system of claim 10 wherein the at least one service module includes a protocol service module and the one or more device-specific commands includes protocol service commands for facilitating protocol configuration and operation on the test related device.

12. The system of claim 10 wherein the at least one service module includes a port service module and the one or more device-specific commands includes port service commands for facilitating port configuration and operation on the test related device, wherein facilitating the port configuration includes configuring speed, media, negotiation, or packet capture settings of test ports of the test related device.

13. The system of claim 10 wherein the at least one service module includes a traffic service module and the one or more device-specific commands includes traffic service commands for facilitating data plane or traffic configuration and operation on the test related device.

14. The system of claim 10 wherein the at least one service module includes a reporting service module and the one or more device-specific commands includes reporting service commands for facilitating test metrics reporting configuration and operation on the test related device.

15. The system of claim 14 wherein the vendor-agnostic traffic generator controller is configured for configuring a fetcher or a fetching service for obtaining traffic and port metrics from a port processor or central processing unit (CPU) of the test related device.

16. The system of claim 10 wherein the at least one service module includes a log generation module and the one or more device-specific commands includes log generation commands for facilitating log generation configuration and operation on the test related device.

17. The system of claim 10 wherein the vendor-agnostic traffic generator controller is configured for configuring the data collector or a collecting service to obtain and aggregate logs from the test related device or test system entities.

18. The system of claim 10 wherein the traffic generator includes a hardware-based traffic generator for sending test traffic to a system under test (SUT) and the hardware-based traffic generator supports the one or more device-specific commands.

19. The system of claim 10 wherein the vendor-agnostic test command is received using a REST API, a gRPC API, or an open traffic generator (OTG) API.

20. A non-transitory computer readable medium having stored thereon executable instructions embodied in the non-transitory computer readable medium that when executed by at least one processor of at least one computer device cause the at least one computer device to perform steps comprising:
 at a vendor-agnostic network test system:
  receiving, via an open application programming interface (API), a vendor-agnostic test command;
  distributing, using at least one distribution rule, the vendor-agnostic test command to at least one service module;
  generating, by the at least one service module and using a translation rule, one or more device-specific commands for performing an aspect of testing or test configuration, wherein the at least one service module generates telemetry data associated with the generation of the one or more device-specific commands and the telemetry data is provided periodically or aperiodically to a data collector using an open telemetry API, wherein the telemetry data includes metadata associated with the generation of the one or more device-specific commands; and
  sending the one or more device-specific commands to a test related device, wherein the test related device includes a traffic generator, wherein generating the one or more device-specific commands includes parsing type length value (TLV) elements in the vendor-agnostic test command and generating, using the parsed TLV elements, a proprietary command for a particular model of traffic generator.

* * * * *